United States Patent [19]

Elkuch

[11] 4,426,197

[45] Jan. 17, 1984

[54] APPARATUS FOR THE CONVERSION OF POWER STROKES OF A RANDOM SEQUENCE AND OF RANDOM LENGTHS OF STROKES INTO POTENTIAL ENERGY

[76] Inventor: Erwin Elkuch, Toni-Aeule-Strasse 10, FL-9490 Vaduz, Liechtenstein

[21] Appl. No.: 299,017

[22] Filed: Sep. 3, 1981

[30] Foreign Application Priority Data

Sep. 30, 1980 [CH] Switzerland ............... 7308/80

[51] Int. Cl.³ .................................. F04B 9/10
[52] U.S. Cl. ........................... 417/331; 417/383
[58] Field of Search ............... 417/330–333, 417/100, 383; 60/497

[56] References Cited

U.S. PATENT DOCUMENTS

| | | | |
|---|---|---|---|
| 755,728 | 3/1904 | Weems | 417/330 |
| 2,490,118 | 12/1949 | Dickenson | 417/383 |
| 3,353,787 | 11/1967 | Somo | 417/330 X |
| 3,487,228 | 12/1969 | Kriegel | 417/331 X |
| 4,208,878 | 6/1980 | Rainey | 417/333 X |
| 4,277,690 | 7/1981 | Noren | 417/100 X |

Primary Examiner—Richard E. Gluck
Attorney, Agent, or Firm—Harness, Dickey & Pierce

[57] ABSTRACT

The apparatus comprises at least one positive displacement pump, which is driven by the sea waves. The quantity of delivery of this pump is adjustable in accordance with the lengths of strokes made by the ocean waves. This is made possible in that the positive displacement pump comprises pistons having different volume displacements. The height of the incoming waves is measured by a membrane box connected to a transducer which generates signals such that only that piston of the plurality of pistons is made to operate, which has by design a volume displacement which gives the optimal recovery of the energy of the ocean waves. The or these pistons pump a working fluid into a storage vessel, which allows the generation of peak load as well as base load electrical energy.

4 Claims, 5 Drawing Figures

APPARATUS FOR THE CONVERSION OF POWER STROKES OF A RANDOM SEQUENCE AND OF RANDOM LENGTHS OF STROKES INTO POTENTIAL ENERGY

BACKGROUND OF THE INVENTION

1. Field of the Invention

The present invention refers to an apparatus for the conversion of power strokes of a random sequence and of random lengths of strokes into potential energy.

2. Description of the Prior Art

Apparatus which convert power strokes appearing sequentially and having the same length of strokes into any kind of energy are widely known.

If, however, the length of strokes differs continuously from each other, the conversion thereof into any kind of energy is quite intrinsic and the recovery extremely small.

If now for instance ocean waves are utilized for the generation of energy any hitherto known devices for the generation of useful energy show extremely complicated designs and, specifically, give extremely little yield so that they are not commercially interesting.

SUMMARY OF THE INVENTION

Hence, it is a general object of the present invention to provide an apparatus for the conversion of power strokes of a random sequence and of random lengths of strokes into potential energy, which is reliable in operation, economical to manufacture, and dependable in use. Now, in order to implement these and still further objects of the invention, which will become more readily apparent as the description proceeds, the apparatus of this development is manifested by the features of comprising at least one pump means driven by the power strokes, whereby the quantity of delivery of said pump means is adjustable in accordance with said lengths of strokes, a working fluid to be transported by said pump means, and a hydro storage means, whereby said pump means is connected to transport said working fluid towards said storage means.

A further object of the invention is to provide an apparatus for the conversion of the power strokes of ocean waves (appearing at a random sequence and having random lengths of strokes) into potential energy, which apparatus comprises an upright supporting means firmly anchored in the sea bed, a plurality of float means guided for vertical movement along and by said supporting means, a plurality of piston-cylinder means, of which at least one is mounted on each said float means, at least one pump means provided with at least two pistons having a top and a bottom piston surface, of which at least one piston is provided with a top piston surface of a greater surface area than its bottom piston surface, a fluid filled conduit means extending between each said piston-cylinder means and said at least one pump means communicating said piston-cylinder means with said bottom piston surfaces, a further conduit means extending from said top piston surfaces to a working fluid circuit, which further conduit means opens at a point intermediate two working fluid circuit check valves into said working fluid circuit, such that in operation of said pump means a predetermined direction of flow of a working fluid contained in said working fluid conduit is secured, and a storage vessel for storing the working fluid pumped by said pump means to store its potential energy.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
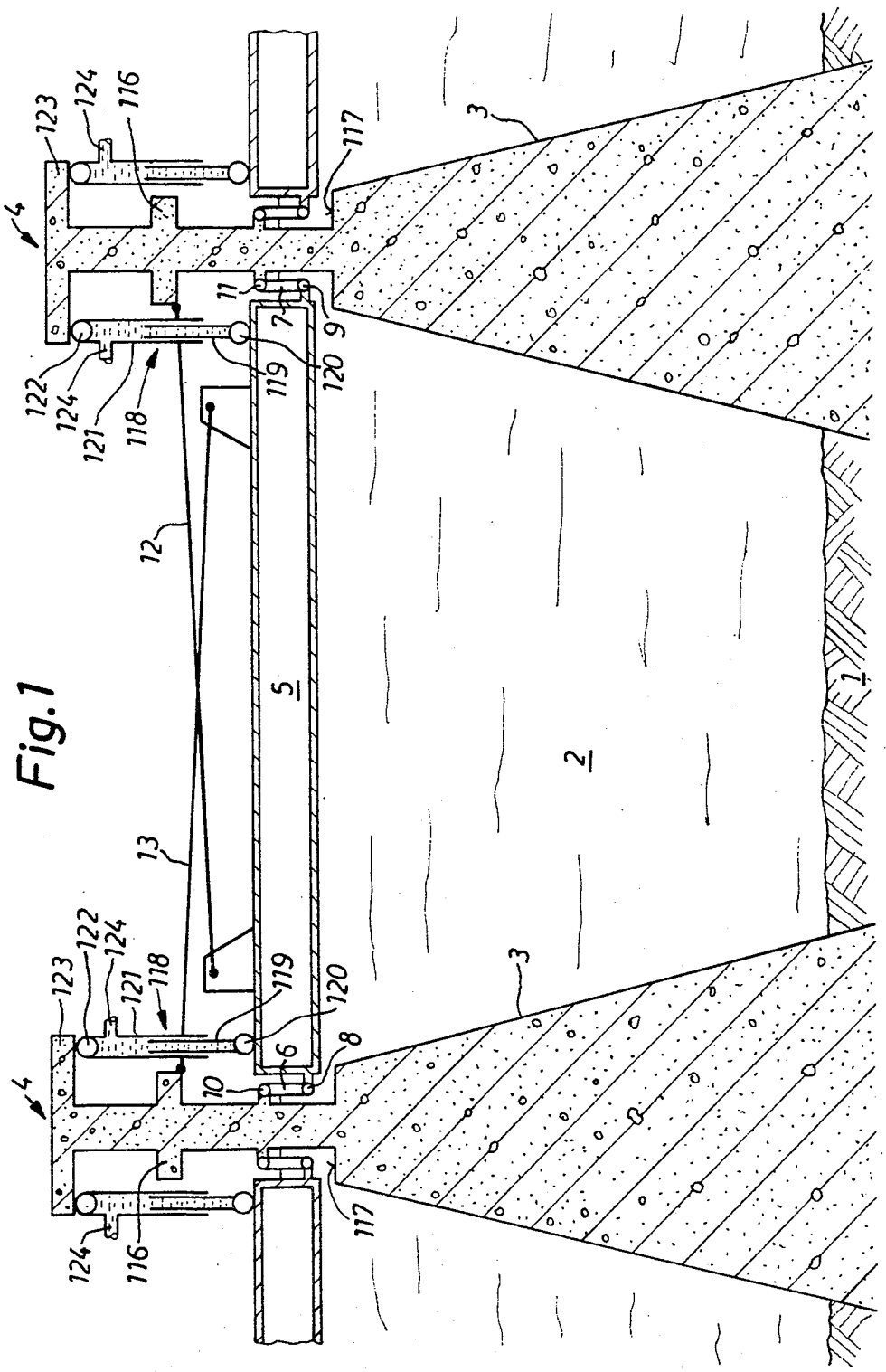
FIG. 1 is a schematical sectional view through a float or pontoon arrangement, including plunger piston-cylinder devices.

Describing now the drawings and considering initially the exemplary embodiment of the power stroke converting apparatus as shown in FIG. 1, it will be understood that there is shown the sea floor or ocean bed, respectively, identified with the reference numeral 1, whereby the body of sea water is identified by the reference numeral 2. There are shown furthermore two support columns 3 made of reinforced concrete, which support columns 3 are firmly anchored in the ocean floor or sea bed, respectively, 1. The portions of the support columns 3 located above the sea surface are shaped as concrete walls 4. It is to be understood that the complete arrangement comprises a plurality of such support columns 3, including their concrete walls 4. In the drawings only two such support columns 3 are shown. Now, between every two concrete walls 4 there is arranged a square box-like float or pontoon identified by the reference numeral 5. A rod 6, 7 is mounted to each of the face surfaces of the floats 5 via joint members 8, 9, respectively. Joint members 8, 9 may be a universal joint or a ball-and-socket joint of a well known common design. The opposite end of each rod 6, 7 is mounted to the concrete wall 4 of the support columns 3 by the agency of a further joint member 10 or 11, respectively, which is of the same design as the joint members 8, 9. This arrangement permits the float 5 to follow the movements of the waves and is guided laterally such that it basically can move only in a vertical direction. Seen in their longitudinal direction, the floats 5 are connected to the respective concrete walls 4 by means of steel cables 12, 13 (See also FIG. 2). These steel cables 12, 13 guide the float 5 in its longitudinal direction and prevent the possibility of the float 5 striking or contacting the concrete walls 4. These walls 4 each comprise a horizontally projecting rib 116, which rib 116 limits the movement of the float 5 in an upward direction. The movement of the float 5 in a downward direction is limited by means of shoulders 117 formed on the support column 3 such as shown in FIG. 1.

On every corner section or area, respectively, of every float 5, there is mounted a plunger piston-cylinder device 118. The piston portion 119 thereof is mounted to the float by means of a further joint member 120. The cylinder portion 121 thereof is mounted by means of a further joint member 122 to a top plate 123 formed integrally on top of the concrete walls 4 of the support columns 3. The piston part 119 is a hollow body. The inner space of every plunger piston-cylinder device 118 is filled by an incompressible fluid, for instance by common fresh water or by oil. The cylinder part 121 is provided with a pipe stub 124, which is connected to a hose or to a joint head (not shown) such that the inner space of the cylinder part 121 is connected with the inner space of a conduit 14, which conduit 14 is schematically shown in FIG. 3.

Figure 3:
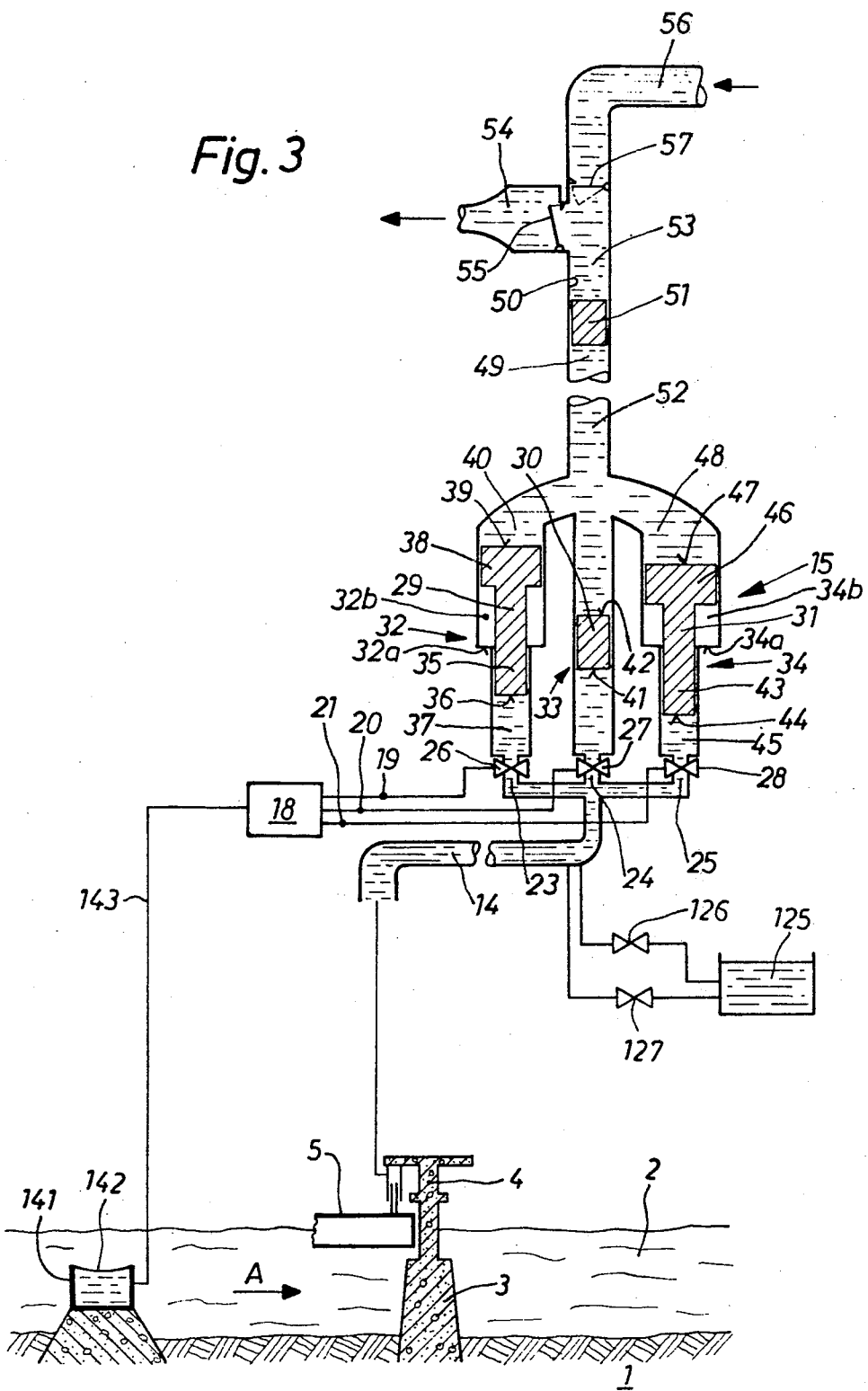
FIG. 3 is an embodiment of a pumping device having several pistons.

Referring to FIG. 3, in order to sense and to measure the height of the incoming waves a diaphragm cell 141 is located on the sea bed, which diaphragm cell 141 is located at a distance from the float 5 in direction to the open sea. This diaphragm cell 141 is filled by a control fluid and comprises solid walls and is closed on top by a membrane. A measuring pressure conduit 143 extends from the diaphragm cell 141 to a control apparatus 18, located in an engine house (not shown), which control apparatus 18 is a digital measuring device or a pressure measuring device with a remote feeler gauge and which control apparatus 18 provides at its output for intance electrical signals, which correspond to the pressure prevailing in the diaphragm cell 141. Such devices are of a widely common design and thus this control apparatus 18 is not particularly described. For example, such a device is manufactured by Haenni and Co. Ltd. in Jegenstorf 3303 Switzerland, and is identified by Product Nos. EDR 213/EDR 223, and has been available since initial marketing thereof in 1979.

The control line 14 extends to a pump 15 whereby the design and construction of this pump will now be described with reference to FIG. 3.

Immediately prior to the pump 15 this conduit 14 branches in the shown embodiment into three inlet stubs 23, 24, 25. Every inlet stub 23, 24, 25 is provided with an unlatchable check valve 26, 27, 28. An unlatchable check valve operates as a common check valve does with the further provision that a control device may override the mechanics keeping the check valve closed during backflow conditions and open the valve. These unlatchable check valves 26, 27, 28, respectively, are controlled by the signals of the outputs 19, 20 and 21, respectively, of the mentioned control apparatus 18, thus they are controlled in accordance with the length of stroke of an incoming ocean wave as registered or sensed, respectively, by the wave height measuring apparatus, the diaphragm cell 141.

Pump 15 comprises a first piston 29, a second piston 30 and a third piston 31. Basically, the number of pistons of the pump 15 can be freely chosen, and this number is by no means restricted to the number of pistons shown in this particular embodiment.

The first piston 29 is located in a first cylinder assembly 32; the second piston 30 is located in a second cylinder assembly 33; and the third piston 31 is located in a third cylinder assembly 34, whereby all three pistons 29, 30, 31 are so-called floating pistons.

The first piston 29 comprises a lower section 35 having a bottom piston surface 36, which lower piston section 35 is located in a lower section 37 of the first cylinder assembly 32. The first piston 29 further comprises an upper section 38 having a top piston surface 39, which is located in an upper section 40 of the first cylinder arrangement 32. The surface area of the bottom piston surface 36 is smaller than the surface area of the top piston surface 39.

The second piston 30, which is located in the second cylinder assembly 33, comprises a bottom piston surface 41 and a top piston surface 42, whereby the surface area of the top piston surface 41 equals the surface area of the bottom piston surface 42.

The third piston 31 also comprises a lower section 43 having a bottom piston surface 44, which lower section 43 is located in a lower section 45 of the third cylinder assembly 34. This third piston 31 comprises, furthermore, an upper section 46 having a top piston surface 47, which is arranged in an upper section 48 of the third cylinder arrangement 34. The surface area of the bottom piston surface 44 is smaller than the surface area of the upper piston surface 47.

Reference numerals 32a and 34a identify openings, which function to prevent a build-up of a vacuum or overpressure, respectively, in the spaces 32b and 34b under the respective pistons.

By comparing the piston surface areas of the shown three pistons it will become evident that the surface area of the three bottom piston surfaces 36, 41 and 44, respectively, are identically the same, but that the surface area of the top piston surface 47 of the third piston 31 exceeds the surface area of the top piston surface 39 of the first piston 29, whereby in turn its surface area exceeds the surface area of the top piston surface 42 of the second piston 30.

Provided or assumed, respectively, that all three pistons move through an identical length of stroke, it will be evident that, for instance, the third piston 31 displaces or pumps, respectively, the largest liquid volume (referred to the top piston surface of the pistons), that the first piston 29 displaces a middle or medium, respectively, liquid volume and that the second piston 30 displaces or pumps, respectively, a smallest liquid volume when these three pistons are compared with each other.

A conduit section 49 is mounted to the top of pump 15. A floating piston 51 is located in this conduit section 49 and is sealed against the inner wall 50 of this conduit. The inner space section 52 of the conduit section 49 extending between piston 51 and pump 15 is filled by common fresh water, i.e., the same kind of water which is arranged in conduit 14.

It shall be noted, however, that conduit 14 can be filled by any kind of incompressible, non-corroding liquid, and that the inner space section 52 of the conduit section 49 may again be filled by the same or a different liquid, which liquid also should be incompressible and non-corrosive.

Conduits 54 and 56 (see top section of FIG. 3) communicate with inner space section 52 of conduit 49 and may be filled with corrosive ocean or sea water (salt water). Valves 55 and 57 are disposed in the conduits 54 and 56, respectively, and may be in contact with this ocean water when the inner space section 56 acting as a suction stub would lead directly into the ocean, whereby in such a case the entry port of this stub would have a filter for filtering sea water to permit sea water to flow back into the ocean at low tide. Detailed information to this end will be given later on. Here it shall only be noted that in such an arrangement the storage basin 64, as shown in FIG. 4, would not be needed.

Figure 4:
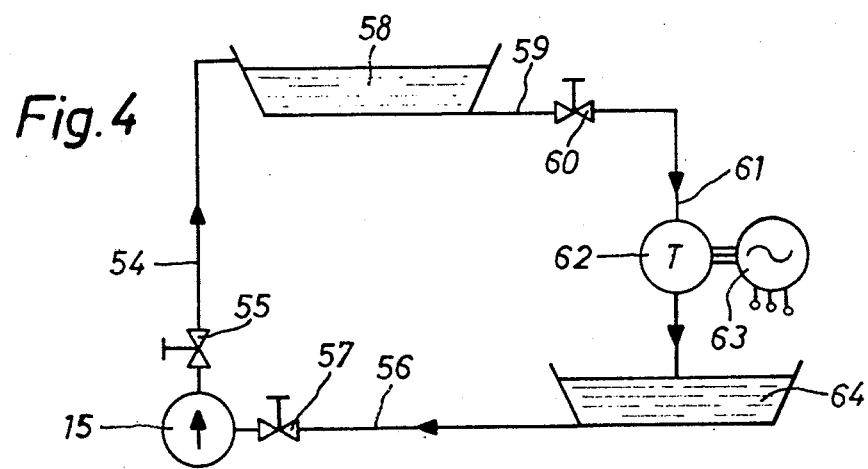
FIG. 4 is schematically a storage power station including a storage basin.
Figure 5:
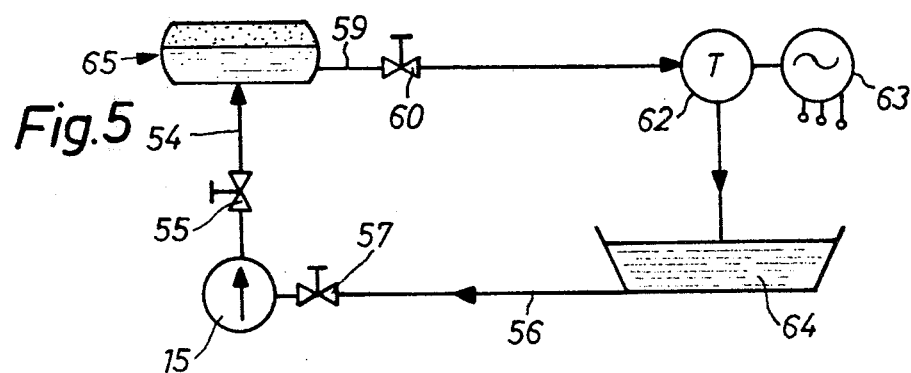
FIG. 5 is schematically a view of a storage power station having a pressure storage vessel.

Fresh water is present in the inner space sections 54 and 56 if the embodiments in accordance with FIGS. 4 and 5 are followed, which will be explained more in detail later on. In these embodiments the low water flows into a basin located (somewhat) above the ocean surface, whereby the suction line 56 extends from this basin. If, according to these embodiments, fresh water is present in the inner space section 52, no floating piston 51 is necessary.

To describe the operation of the pumping means of FIG. 3, the wave moving in the direction of the arrow A will lift the float 5. Due to this vertical lifting movement the piston part 119 (see also FIG. 1) will be displaced vertically upwards. Because the cylinder part 118, which is fixed to the wall 4, cannot be moved vertically (it can rotate somewhat around point 122), the fluid present in the inner space of the plunger piston-cylinder device 118 will be made subject to a pressure due to the decreasing volume of the plunger piston-cylinder device 118, such that this pressure will be transferred via conduit 14 to the bottom piston surfaces 36, 41 and 44, respectively.

Assuming check valve 26 is opened, the incompressible fluid column, which is displaced by the movement of piston 119 on float 5, causes the first piston 29 to carry out a vertically upwards directed working stroke. Since the top piston surface 39 of piston 29 has a larger surface area than the bottom piston surface 36 thereof, accordingly, due to the hydraulic "step-up" based on the cross-sectional areas, a larger water volume will be pumped in comparison with the displaced volume acting onto the bottom piston surface 36. The conduit 49 is also filled by water. In this particular embodiment the conduit 49 is filled by two different liquids, separated from each other by a floating piston 51.

Due to the lifting stroke of piston 29 of pump 15, the fluid or liquid column present in the inner space section 53 of conduit 49 will be shifted to open the check valve 55. The column will be pumped, respectively, via the pump pressure pipe 54, into a hydro storage vessel, not shown in FIG. 1, where stored water will be used to generate useful energy such as will be described in detail further below.

As soon as the float 5 reaches the decreasing part or half, respectively, of the ocean wave, the float 5 will move vertically downwards.

Due to the unlatchable check valve 26, piston 29, which is still in its uppermost position, will be allowed to move downwards. The liquids present in conduit 49 will also shift downwards together with the floating piston 51. Accordingly, check valve 57 will open and the working fluid will be able to flow through the suction pipe 56 to terminate the suction stroke of the pumping means.

The controlling of the individual valves 26, 27, 28 and the pumping means proceeds as follows.

The incoming waves have varying wave heights. However, it is an object to utilize, in spite of these random wave heights, an optimal recovery of the energy which can be generated by the working strokes of the waves. To this end the total piston cross-sectional area of pump 15 (consisting of a plurality of working piston units) is adjustable. It is known, furthermore, that in ocean wavepower stations an incoming wave is utilized optimally when a float 5 submerges into the water by a distance equalling half of the wave height. The height of the water column and the piston cross-sectional areas of the pistons 39, 42, 47 must be chosen such that they correspond predeterminedly to the volume of the float. If several pumps are allocated to one given float, which is a preferred arrangement, the piston surface cross-sectional areas of all such pumps, having the same size, must be added. The more varied the mentioned pistons and piston surface areas 39, 42, 47 are available, the more exactly the float 5 remains submerged halfway in a single wave and accordingly the better the efficiency is that can be achieved. The efficiency has been proven to be best then when the float 5 begins its vertical upward movements exactly at the position corresponding to half of the wave height. The decrease of the efficiency in an area close to the optimum is very small and decreases progressively the further or the more a float is remote from the half of the submerging depth of a single given wave.

In order now to effectively utilize the randomly varying heights of stroke of all incoming waves of the ocean, the pump is provided with the plurality of pistons described in this preferred embodiment, such that the volume water pumped into the pump pressure pipe 54 and pumped to this pipe 54 is independent from the heights of stroke which are available.

By way of example, with a division of the total piston surface area into three areas, only the second piston 30, giving the smallest pumped volume, will work if the incoming waves are small. If the wave heights of the incoming waves are of medium extent only the first piston 29 will pump (a medium volume), and if the incoming waves are large waves, only piston 31, giving the largest pumped volume, is in operation. Thus, the length of stroke as well as the surface area of the third piston 31 is larger than that of piston 29 or of piston 30.

Referring again to FIG. 3, the diaphragm cell 141 measures the wave heights of the waves moving towards float 5. Due to the distance between the float and the measured device 141 this pressure, i.e. wave height, is measured before float 5 is lifted by a particular wave.

The sensed wave height (static pressure) is forwarded via pressure line 143 into the control apparatus 18. This control apparatus 18 comprises three outlets 19, 20, 21, which forward signals to the unlatchable check valves 26, 27, 28, respectively, which signals may be of an electrical, hydraulic or pneumatic nature.

If now the wave height measuring device 141, 142 senses a "small" wave, the signal sent through control line 20 will control check valve 27, and only check valve 27, such that it opens and makes communication to the second (the smallest) piston 30. Accordingly a pumping in the pump 15 is carried out by this smallest piston 30 only and a relatively small water volume will be pumped into pump pressure line 54, whereby the height of stroke (water column under and water column over piston 30) remains unaltered, while the power stroke delivered by the wave is optimally utilized.

It must also be noted that the control device 18 controls the unlatchable check valve 27 such that this check valve 27 opens at the earliest after the float has passed the crest of the wave and latest when the next following wave reaches half of its height.

Because now after every working stroke the pistons 29, 30, 31 must return into their individual, original positions, and because the surface of the ocean changes continuously due to the tides, line 14 is also connected to a storage vessel 125. A first so-called after-suction valve 126 serves to communicate the storage vessel 125 in such cases with conduit 14 when the float 5 will come to be arranged further down than previously, i.e. when low tide begins. In this position of suction valve 126 fluid flows from the storage vessel 125 into conduit 14 to avoid a disruption of the fluid present in conduit 14. A second direction independent control valve 127 serves to convey fluid into the storage vessel 125 as soon as the float 5 has risen and thus is located higher than previously as in the case by the increasing tide. These valves 126, 127 cause the pistons 29, 30, 31 to be located always at least substantially at the same location in pump 15 such that the prevailing position of the pistons 29, 30, 31 is to a large extent independent from any prevailing mean level of the ocean due to low and high tides. Accordingly, different levels due to tides are equalized. Valves 127, 126 are of a design commonly available on the market, and, therefore, there is no need to describe them more in detail.

Reverting now again to the operation of the pump, there will now be described its operational details by incoming waves of larger heights.

If the wave height measuring device, the diaphragm cell 141, senses a wave of medium height a signal appearing at the output of the control apparatus 18 will lead to an opening of the unlatchable check valve 26 of the middle (first) piston 29. The float, after it has submerged by a distance corresponding to half of the wave height will move upwards such that the earlier explained pumping operation will be carried out therewith.

Because now piston 29 pumps a larger volume than piston 30, this higher wave is utilized optimally.

The largest piston 31 will be similarly utilized only when waves of the largest wave heights are sensed by diaphragm cell 141.

It is to be noted here that except from the chosen number of pistons, the relative definitions "small", "medium", "large" waves are used only for reasons of explanation. The definition of the wave heights relative to each other will be chosen based on the number of pistons in the pump 15 depending accordingly from its operation.

It has been mentioned earlier, that a wave is optimally utilized when the float 5 submerges in the wave by a distance corresponding to half of the wave height.

If an incoming wave has a wave height leading to the operation of the first piston 29, an additional control circuit arranged in the control apparatus 18 will operate such that immediately prior to the float 5 reaching the wave crest of this wave the check valve 26 gets moved into its closed position. Accordingly, piston 29 is taken out of operation, and instead the check valve 27 will be unlatched and piston 30 put into operation such that the last part of the stroke of height of the wave is efficiently utilized. Immediately after the wave crest has passed float 5 the opposite operation steps will be made, i.e. piston 30 taken out of operation and again piston 29 put into operation, to efficiently utilize the wave. A similar procedure will be followed at the area of the wave trough.

Figure 2:
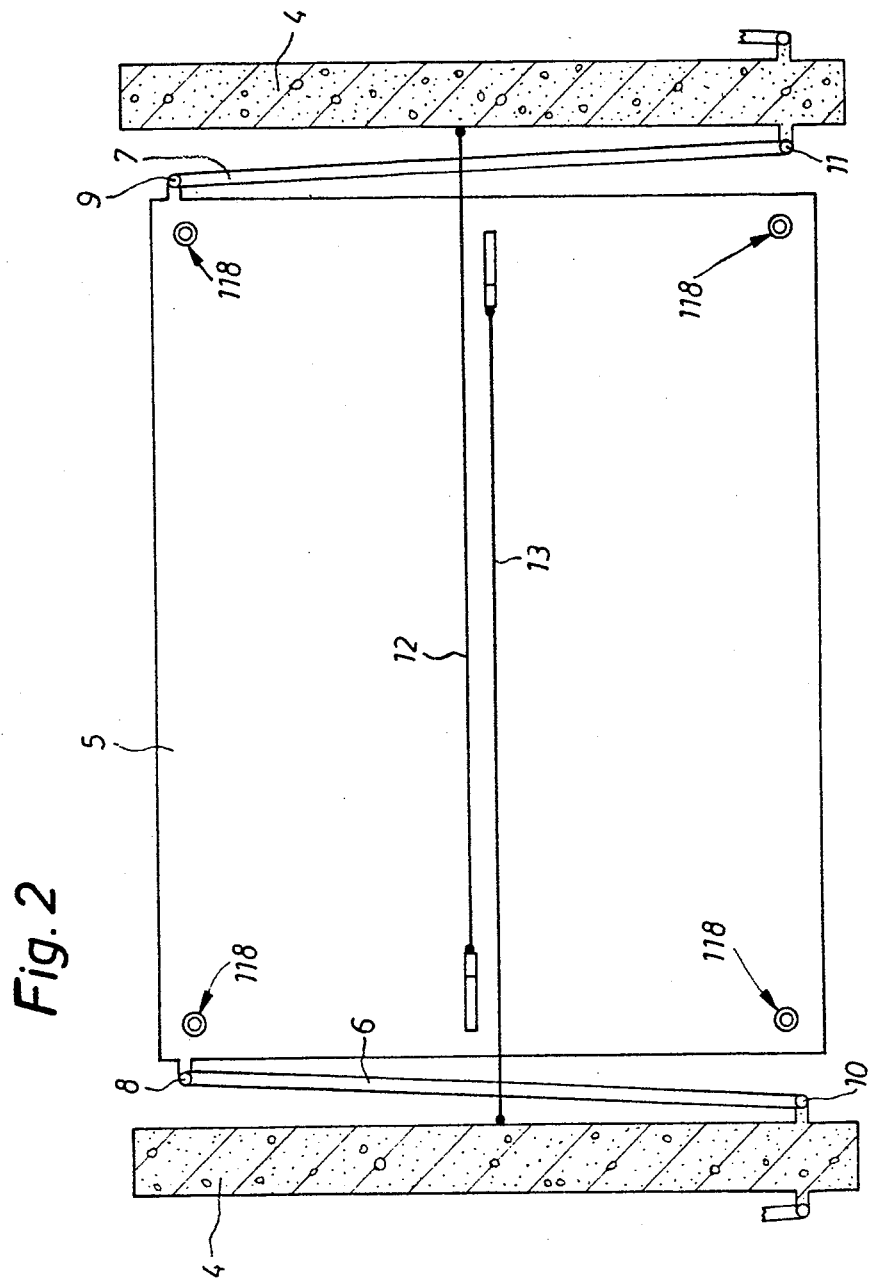
FIG. 2 is a top view of the arrangement shown in FIG. 1, whereby some parts are cut away.

Now the application or operation, respectively, of the embodied machinery of FIGS. 1–3 will be described in conjunction with a water power station. Attention is now drawn to FIG. 4.

In FIG. 4 there is schematically shown the pump 15 of FIG. 3, the pressure conduit 54, check valve 55, and the suction conduit 56, including its check valve 57. Such arrangement encompassing a pump having a pressure line, a suction line and check valves to determine the direction of flow of the pumped fluid is a known arrangement.

Fresh water contained in the pressure conduit 54 is pumped into a storage basin 58 which is located at a higher level than pump 15 and constructed according to well known designs. This storage vessel 58 comprises a discharge line as well as a shut-off valve 60 mounted therein. This shut-off valve 60 will be opened during a discontinuous operation as soon as the water level of the storage basin 58 reaches a predetermined height or during peak load demands of an electrical power distribution net.

If the shut-off valve 60 opens, water flows through the feed line 61 to a water turbine 62, (which water turbine 62 can obviously be also a so-called pump turbine such as used in pump storage power stations). The water turbine 62 is coupled to an electrical power generator 63.

Water exiting from this water turbine 62 is led into a further storage basin 64, from which storage basin 64 this water is discharged through the suction line 56 and again led to pump 15, i.e. pump 15 pumps water out of the lower storage basin 64.

Because now in this embodiment the working liquid is pure fresh water, float 5 is the only member of the complete apparatus which is in contact with the corroding salt water. (Obviously except the concrete supports, which however are not corroded by sea water.) If the float is made completely from a plastic material or if it carries a protective layer of plastics material, no corrosion problems will occur at this end.

It is to be noted, furthermore, for corrosive protection, the rods 6, 7 mounted to the float 5, the joint members 8, 9, 10, 11, 120, 122, and the piston-cylinder devices 118 may be located within bellows, made for instance from an elastomeric material, such that also these members of the apparaus will not be in contact with corroding sea water.

In FIG. 5 there is shown a further alternative embodiment of the application of the pump 15 shown in FIG. 3.

The working fluid (fresh water) is pumped via pump 15 through check valve 55 and into the pressure conduit 54 and finally into a so-called hydro storage vessel 65. Such vessel 65 encloses a compressible gas, such as for instance nitrogen, air etc. and water such that by raising the water level, the gas will be compressed and accordingly will store hydraulic energy.

As a further alternative this hydro storage vessel 65 may be a spring-loaded storage vessel, a hydro pneumatic storage vessel having a partition wall, or may be of any known design.

The operation circuit of the working liquid in FIG. 5 is the same as shown in FIG. 4. Again there is present a discharge line 59, a shut-off valve 60, a turbine 62, and an electrical power generator 63, as well as a further lower storage basin 64 out of which lower storage basin 64, the working liquid flows through suction pipe 56 and check valve 57 back to pump 15.

If the power generator shall deliver base energy, i.e., be continuously in operation, the hydro storage vessel 65 may be provided in the form of an expansion chamber (air vessel).

Finally, it is to be noted that instead of the storage basin 64 the ocean may be utilized as "storage basin" in that the pump sucks water directly out of the ocean and the water discharge from the turbine 62 flows back into the ocean. Although operation with salt water is feasible it shall be noted that in such case all parts of the complete assemblies, specifically the metal parts, will be in continuous contact with salt water and must be protected against corrosion.

While there are shown and described present preferred embodiments of the invention, is to be distinctly understood that the invention is not limited thereto, but may be otherwise variously embodied and practiced within the scope of the following claim. Accordingly,

What is claimed is:

1. An apparatus for the conversion of the power strokes of ocean waves appearing at a random sequence and having random lengths of strokes into potential energy, comprising
   an upright supporting means firmly anchored in the sea bed,
   a plurality of float means guided for vertical movement along and by said supporting means,
   a plurality of piston-cylinder means of which at least one each is mounted on one said float means,
   at least one pump means provided with at least two pistons having a top and a bottom piston surface of which at least one piston is provided with a top piston surface of a greater surface area then its bottom piston surface,
   a fluid filled conduit means extending between each said piston-cylinder means and said at least one pump means communicating said piston-cylinder means with said bottom piston surfaces,
   a working fluid circuit,
   a further conduit means extending from said top piston surfaces to said working fluid circuit, which further conduit means opens at a point intermediate two working fluid circuit check valves into said working fluid circuit such that in operation of said pump means a predetermined direction of flow of a working fluid contained in said working fluid circuit is secured, and
   a storage vessel for storing the working fluid pumped by said pump means thus storing its potential energy.

2. The apparatus of claim 1, comprising further a pressure sensing diaphragm device arranged on the sea bed and intended to sense individual static pressures due to the height of the ocean waves passing over said pressure sensing diaphragm device,
   a plurality of inlet control valves located at said fluid filled conduit means and intended to make or break communication between each said bottom piston surfaces and said fluid filled conduit means,
   a control circuit communicating said pressure sensing diaphragm device with a transducer apparatus which provides an output corresponding to the sensed static pressure and controlling the position of said inlet control valves, in order to control the communication between any bottom piston surfaces with said fluid filled conduit means in accordance with the sensed wave height.

3. The apparatus of claim 2, wherein a floating piston is located in said further conduit means such to separate a fluid contained in said further conduit means and extending between said top piston surfaces and said floating piston from a working fluid of said working fluid circuit.

4. The apparatus of claim 2, wherein said working fluid circuit opens into said storage vessel and wherein the outlet of said storage vessel is connected to a water turbine-electrical power generation station.

* * * * *